(No Model.)
W. M. PIPER.
MILK PAIL.
No. 440,193. Patented Nov. 11, 1890.
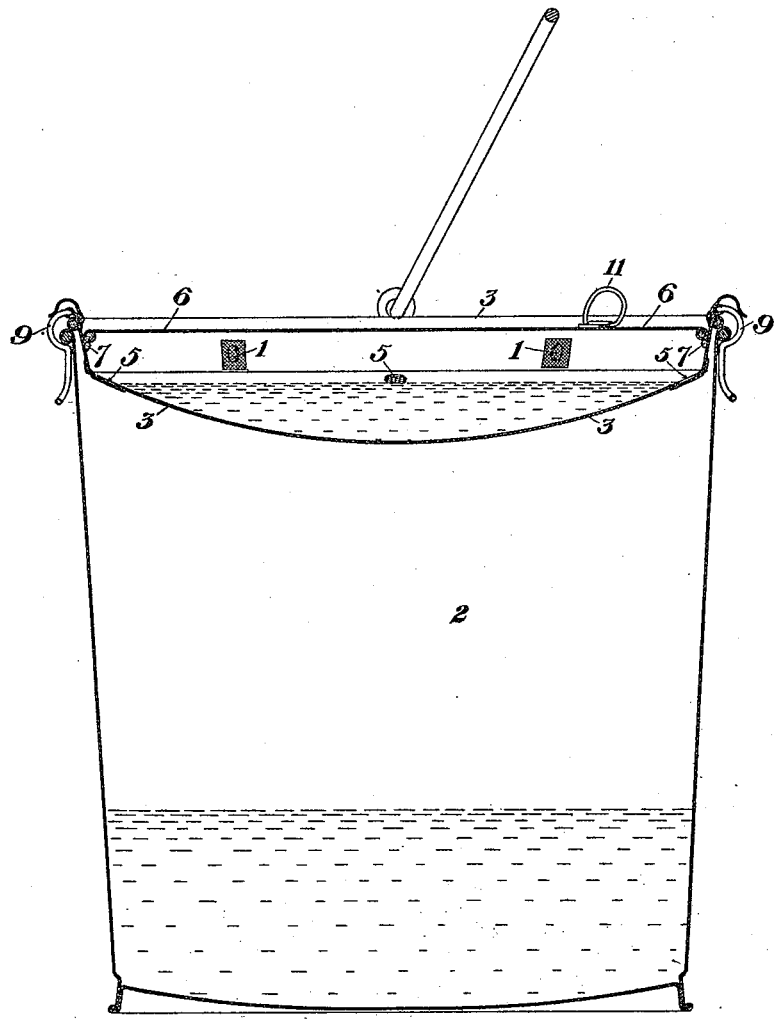
WITNESSES
Thomas W. Bakewell
H. L. Gill
INVENTOR
William M. Piper

UNITED STATES PATENT OFFICE.

WILLIAM M. PIPER, OF ALLEGHENY, PENNSYLVANIA.

MILK-PAIL.

SPECIFICATION forming part of Letters Patent No. 440,193, dated November 11, 1890.

Application filed March 28, 1890. Serial No. 345,714. (No model.)

*To all whom it may concern:*

Be it known that I, WILLIAM M. PIPER, of Allegheny, in the couny of Allegheny and State of Pennsylvania, have invented a new and useful Improvement in Milk-Pails, of which the following is a full, clear, and exact description, reference being had to the accompanying drawing, forming part of this specification, which shows in vertical section a milk-pail constructed in accordance with my invention.

The object of my invention is to provide a milk-pail of improved construction, so that if overturned accidentally during the milking of the cow or at any other time the contents of the pail shall not be spilled.

In the drawing, 2 represents the pail, which may be of any convenient form, since my improved cover or attachment may be applied to any pail of a proper size to fit the same. The pail is provided with a removable dish-shaped cover 3, the greatest diameter of which is about equal to the inside diameter of the pail, and which is provided with a marginal bead or flange, whose function is to sustain the cover within the pail. Around the sides of the dish portion of the cover, at a little elevation above the bottom thereof, is a hole or series of holes 5, preferably covered by wire-netting, and above the holes 5 there may also be a second series of holes 1. Within the cover 3 and covering the same is a disk 6, formed of a wire-net sieve or perforated plate, which may be supported by projections 7 in the cover. The cover is detachably locked on the pail by means of a catch, a convenient form of which is a spring lip or hook 9, secured to the inner rim of the cover and adapted to fit over the rim of the pail, as shown in the drawing, and the cover is also preferably provided with a ring or handle 11, by which it may be lifted from the pail. If desired, a ring or gasket of rubber or similar material may be interposed between the rim of the cover and the pail to seal the joint between these parts.

The drawing shows the pail with the cover fitted thereon in position. In using the pail the milk is milked from the cow directly upon the sieve 6, and passes through the sieve upon the dish or cover 3, from which it runs through the holes 5 into the pail after a sufficient body of milk has accumulated in the cover to cause the milk to rise to the level of the holes. If these holes should not be large enough to carry off the milk, the excess will be drained off by the upper holes 1. The advantage of thus milking directly upon the sieve is that the milk is prevented from the splashing which would occur if the milk were discharged directly upon an imperforate plate situate so near the rim of the pail, and all impurities—such as hairs, &c.—are excluded from the pail. If the bucket should be overturned, the comparative smallness of area of the holes would prevent the spilling of any considerable portion of the milk. The fact that the holes 5 are elevated above the bottom of the dish-shaped cover near the widest portion thereof causes a body of milk to accumulate therein, and in milking the jets of milk after passing the sieve do not strike directly upon the metal cover, but on the surface of the pool of milk included therein, and splashing of the milk is prevented thereby.

The construction of the device by which a pool of milk is retained in the cover adds very greatly to its efficiency and forms one of the distinguishing features of my invention.

When it is desired to empty the pail, the cover, including the sieve, may be removed by disengaging the catches 9, thus leaving the pail free to be emptied and presenting no obstruction to its ready cleansing. The parts of the cover—viz., the sieve and the dish—may also be detached without difficulty and may be separately washed.

I am aware that it is not new to provide a milk-pail with a conical cover or covers having perforations near the base portion for the purpose of straining the milk as it comes from the cow and retaining the sediment. Such construction I do not claim. My cover differs therefrom in that I employ a shallow dish which fits over the mouth of the pail and has a series of perforations near the margin of the pail, the consequence of which is that in milking a broad shallow pool of milk remains in the cover, which effectually prevents that splashing of the milk-jets which occurs when they strike against bare metal. The result is that I can use successfully a very shallow cover, which takes up but little room in the pail.

I claim—

An attachment for milk-pails, consisting in a shallow concave dish or cover adapted to fit over the mouth of a pail and having perforations situate at about its widest portion or margin, whereby there will be retained in said dish or cover a broad shallow pool of milk substantially coextensive with the mouth of the pail, and a sieve 6 above the dish or cover, substantially as and for the purposes described.

In testimony whereof I have hereunto set my hand this 22d day of February, A. D. 1890.

WILLIAM M. PIPER.

Witnesses:
 THOMAS W. BAKEWELL,
 H. M. CORWIN.